(12) United States Patent
Greenspan et al.

(10) Patent No.: US 9,305,097 B2
(45) Date of Patent: Apr. 5, 2016

(54) SYSTEM AND METHOD FOR DISSEMINATION OF RELEVANT KNOWLEDGE

(75) Inventors: Steven L. Greenspan, Scotch Plains, NJ (US); Carrie E. Gates, New York, NY (US)

(73) Assignee: CA, Inc., New York, NY (US)

( * ) Notice: Subject to any disclaimer, the term of this patent is extended or adjusted under 35 U.S.C. 154(b) by 2188 days.

(21) Appl. No.: 12/116,662

(22) Filed: May 7, 2008

(65) Prior Publication Data

US 2009/0281990 A1   Nov. 12, 2009

(51) Int. Cl.
*G06F 17/30* (2006.01)

(52) U.S. Cl.
CPC .............................. *G06F 17/30867* (2013.01)

(58) Field of Classification Search
CPC ............... G06F 17/30867; G06F 17/30395; G06F 17/30696; G06F 17/30722; G06F 17/30011
USPC .................................. 707/708, 713, 706, 722
See application file for complete search history.

(56) References Cited

U.S. PATENT DOCUMENTS

| | | | | |
|---|---|---|---|---|
| 7,577,718 B2 * | 8/2009 | Slawson | ............ | G06F 17/30867 707/999.003 |
| 7,822,738 B2 * | 10/2010 | Andersen | .......... | G06F 17/30395 707/713 |
| 7,831,601 B2 * | 11/2010 | Oral | ................. | G06F 17/30696 707/722 |
| 8,261,196 B2 * | 9/2012 | Oral | ................. | G06F 17/30696 707/706 |
| 2003/0074409 A1 * | 4/2003 | Bentley | ............... | H04L 12/5855 709/206 |
| 2005/0256766 A1 * | 11/2005 | Garcia et al. | .................... | 705/14 |
| 2006/0031043 A1 * | 2/2006 | Oral | ................. | G06F 17/30722 702/187 |
| 2006/0031183 A1 * | 2/2006 | Oral | ................. | G06F 17/30011 |
| 2006/0031197 A1 * | 2/2006 | Oral | ................. | G06F 17/30696 |
| 2006/0031220 A1 * | 2/2006 | Newbold | .......... | G06F 17/30867 |
| 2006/0031253 A1 * | 2/2006 | Newbold | .......... | G06F 17/30722 |
| 2008/0005086 A1 * | 1/2008 | Moore | ............. | 707/3 |
| 2008/0028036 A1 * | 1/2008 | Slawson | ............ | G06F 17/30867 709/217 |
| 2008/0082513 A1 * | 4/2008 | Oral | ................. | G06F 17/30696 |
| 2008/0133501 A1 * | 6/2008 | Andersen | .......... | G06F 17/30867 |
| 2008/0243785 A1 * | 10/2008 | Stading | ............................ | 707/3 |

OTHER PUBLICATIONS

Boulton, Clint, "Google CEO Schmidt Pitches Autonomous Search, Flirts with AI," http://www.eweek.com/index2..php?option=content &task=view&id=63710&pop=1&hide (2 pages), Sep. 28, 2010.

* cited by examiner

*Primary Examiner* — Jean M Corrielus
(74) *Attorney, Agent, or Firm* — Baker Botts L.L.P.

(57) ABSTRACT

A method comprises extracting one or more document identifiers from a document currently displayed on the user's computer screen. The method further comprises searching an enterprise network, using the one or more document identifiers, for one or more related documents that are related to the document currently displayed on the user's computer screen. The one or more related documents may then be filtered, and the user may be notified of the one or more filtered related documents.

24 Claims, 3 Drawing Sheets

SYSTEM AND METHOD FOR DISSEMINATION OF RELEVANT KNOWLEDGE

TECHNICAL FIELD

This disclosure relates generally to information sharing, and more specifically to a system and method for dissemination of relevant knowledge.

BACKGROUND

With advances in technology and network capabilities, people today have access to more information than ever before. However, this abundance of knowledge may not always be utilized efficiently. If massive amounts of information are directly communicated to users, they may perceive information overload and either ignore or fail to recognize useful information. On the other hand, if people are left to search and find information for themselves, they may be unable to effectively find helpful information among the overabundance of available information.

SUMMARY OF EXAMPLE EMBODIMENTS

The present disclosure is directed to a system and method for disseminating relevant information. The teachings of the present disclosure may allow for more accurate and efficient delivery of information to a user.

In accordance with a particular embodiment of the present disclosure, a method comprises extracting one or more document identifiers from a document currently displayed on the user's computer screen. The method further comprises searching an enterprise or secure network, using the one or more document identifiers, for one or more related documents that are related to the document currently displayed on the user's computer screen. The one or more related documents may then be filtered, and the user may be notified of the one or more filtered related documents. More specifically, the method may comprise generating a user profile, and the related documents may be filtered using this user profile. According to particular embodiments, the method comprises receiving, from the user, a selection of at least one of the one or more filtered related documents and updating the user profile to reflect this selection by the user.

In accordance with another aspect of the present invention, a system comprises a processor that is operable to extract one or more document identifiers from a document currently displayed on the user's computer screen. The processor is further operable to search an enterprise or secure network, using the one or more document identifiers, for one or more related documents that are related to the document currently displayed on the user's computer screen. The processor is further operable to filter the one or more related documents and notify the user of the one or more filtered related documents.

In accordance with another aspect of the present invention, logic encoded in a computer readable medium is operable, when executed on a processor, to extract one or more document identifiers from a document currently displayed on the user's computer screen. The logic is further operable to search an enterprise or secure network, using the one or more document identifiers, for one or more related documents that are related to the document currently displayed on the user's computer screen. The logic is further operable to filter the one or more related documents and notify the user of the one or more filtered related documents.

Technical advantages of particular embodiments of the present disclosure include a system and method for dissemination of relevant information based on a user profile. This may allow the dynamic generation of a user profile, which may provide more accurate, user-specific knowledge dissemination. Further technical advantages of particular embodiments include a user profile that may be edited by the user. This may allow a user to specify the types of information provided and the methods of delivery.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

In an enterprise environment, a wealth of information about corporate projects may be available via web pages, wikis, and other related online sites. However, employees often may not know that particular projects are being pursued, and therefore may never know to look for these corporate pages. This may result in different business units working on similar problems with no coordination. Furthermore, employees may miss a relevant meeting or forum because they are unaware of the event.

Knowledge sharing across teams and business units may be useful for creating efficiency and innovation in the workplace. Traditional methods may generally be categorized as "push" or "pull" technologies. Push technology refers to communications originating from a server or other central source, and may come in the form of broadcast emails. This may lead to information overload, presenting information that is not always relevant to a particular user. Pull technology, on the other hand, refers to communications that are requested by an individual user. Pull technology may be embodied by intranet portals, wikis, blogs, or shared bookmarks. However, users may still miss out on relevant information, as this approach relies on a user's active efforts to seek out information.

According to the teachings of the present disclosure, a system and method for disseminating relevant information is provided. This may reduce some of the problems associated with other methods of information sharing and dissemination.

Figure 1:
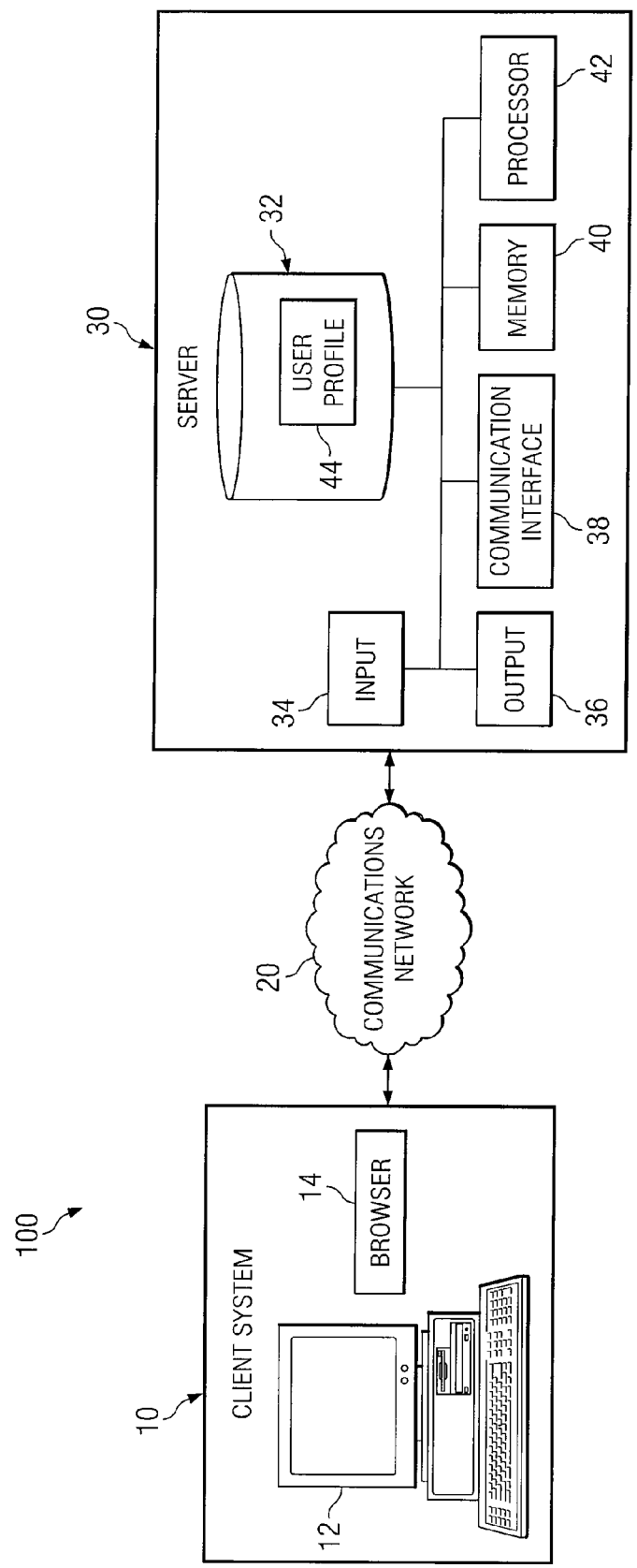
FIG. 1 is a schematic drawing illustrating a computer network configuration suitable for use within particular embodiments of the present disclosure.

FIG. 1 illustrates a communications system, generally designated by reference numeral 100. Communications system 100 includes client system 10, communications network 20, and server 30.

Client system 10 includes a computer terminal 12, or other medium for accomplishing electronic communication. Terminal 12 may also include specific software including a browser 14 which allows standardized communication with network server 30.

Server 30 may refer to any device operable to deliver documents, graphical images, videos, and other elements that are sent to the client system 10. According to the illustrated embodiment, server 30 includes storage device 32, an input device 34, an output device 36, a communication interface 38, a memory device 40, and a processor 42.

Input device 34 may refer to any suitable device operable to input, select, and/or manipulate various data and information. Input device 34 may include, for example, a keyboard, mouse, graphics tablet, joystick, light pen, microphone, scanner, or other suitable input device.

Output device 36 may refer to any suitable device operable for presenting or displaying information to a user. Output device 36 may include, for example, a video display, a printer, a plotter, an audio device, such as speakers, or any other suitable output device.

Communication interface 38 may refer to any suitable device operable to receive input for server 30, send output from server 30, perform suitable processing of the input or output or both, communicate to other devices, or any combination of the preceding. Communication interface 38 may include appropriate hardware (e.g. modem, network interface card, etc.) and software, including protocol conversion and data processing capabilities, to communicate through a LAN, WAN, or other communication system that allows server 30 to communicate to other devices. Communication interface 38 may include one or more ports, conversion software, or both.

Memory device 40 may refer to any suitable device operable to store and facilitate retrieval of data, and may comprise random access memory (RAM), read only memory (ROM), a magnetic drive, a digital video disk (DVD) drive, removable media storage, any other suitable data storage medium, or a combination of any of the preceding.

Processor 42 may refer to any suitable device operable to execute instructions and manipulate data to perform operations for server 30. Processor 42 may include, for example, any type of central processing unit (CPU).

Storage device 32 may refer to any suitable device operable for storing data and instructions. Storage device 32 may include, for example, a magnetic disk, flash memory, optical disk, or other suitable data storage device. In the illustrated embodiment, storage device 32 comprises user profile 44.

User profile 44 may include information about a user, including but not limited to interests and organizational role within an enterprise. The user profile 44 may be used to search for other documents relevant to the user's interests and/or role, and then present the documents to the user. Although a single user profile is illustrated, in alternative embodiments, there may be multiple user profiles, including a profile for each user of communications system 100. Additionally, user profile 44 may be stored in various locations other than storage device 32. In particular embodiments, a user profile may be stored within the memory of an individual's computer system 12.

Figure 2:
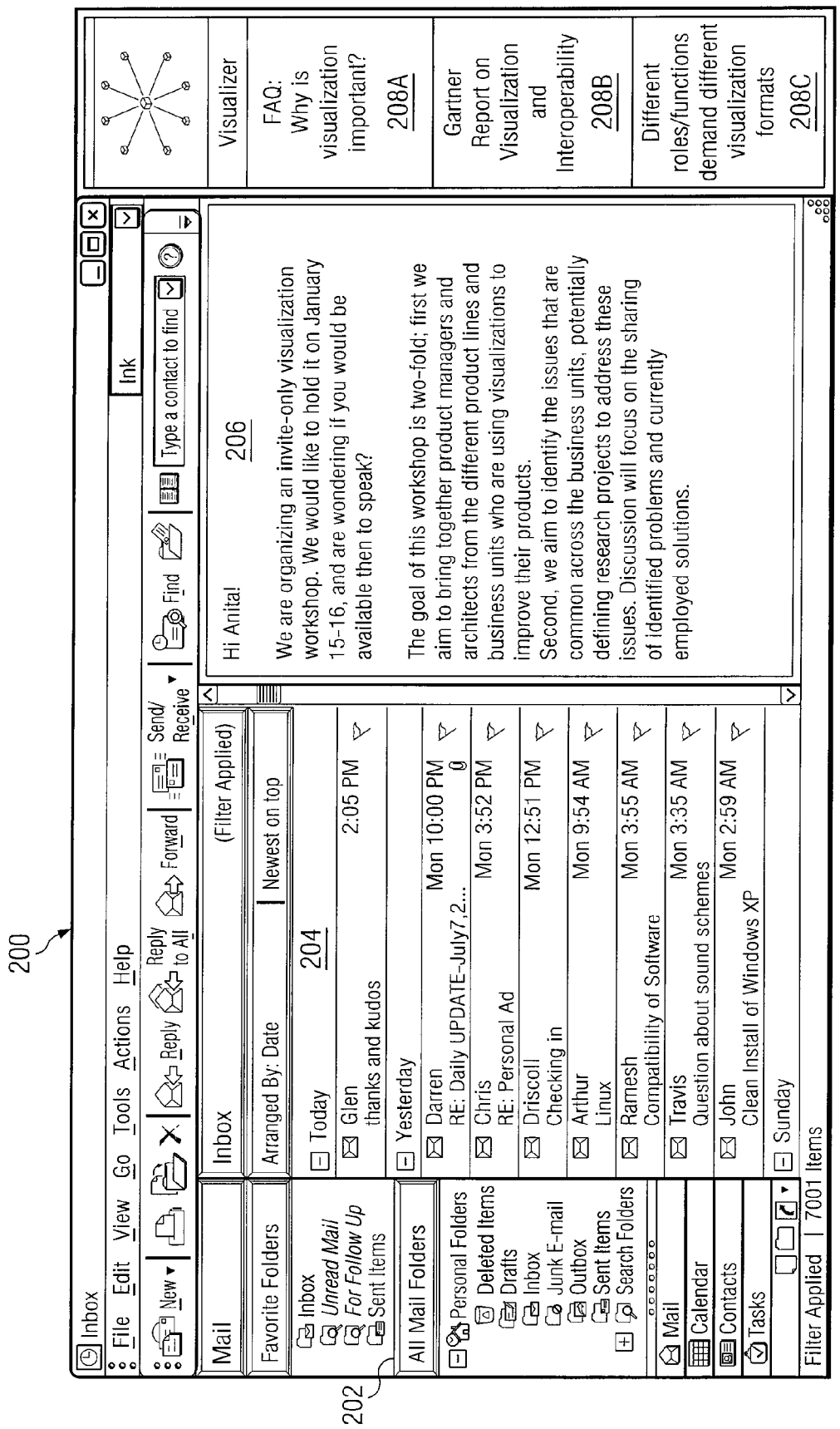
FIG. 2 is a schematic drawing illustrating a user interface in accordance with particular embodiments of the present disclosure.

FIG. 2 illustrates a user interface, generally designated by reference number 200, in accordance with particular embodiments of the present disclosure. In the illustrated embodiment, user interface 200 comprises an email application. However, in alternative embodiments, user interface 200 may also include, but is not limited to, Internet web pages, intranet web pages, extranet web pages, text documents, spreadsheets, slide show presentations, or calendar applications.

In the illustrated embodiment, user interface 200 comprises a selection of mail folders 202, a list of messages 204 located within a given folder, and a window for displaying a selected email 206. Email application 200 may be any client-based or web-based mail application. In particular embodiments, email application 200 may comprise a client-based application connecting to an enterprise or other secure business network, such as an office intranet. The list of messages 204 may comprise information about particular email messages, such as sender, subject line, and date received. In particular embodiments, it may also comprise a portion of the body of text of the email. Window 206 may display the body of text of an email selected by the user.

Additionally, in accordance with the teachings of the present disclosure, email application 200 includes user notifications 208A-208C. These may be notifications of documents, websites, events, emails, or other information that may be of particular interest or relevance to the user. These notifications may take the form of links, windows, tabs, pop-ups, or similar format for displaying information in the periphery of the user's screen.

Figure 3:
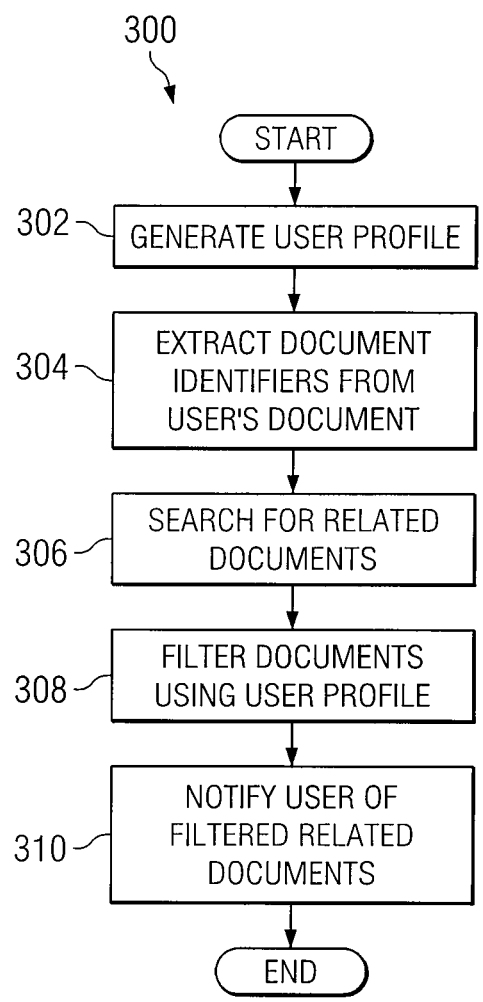
FIG. 3 is a flow diagram illustrating a method for disseminating information in accordance with particular embodiments of the present disclosure.

FIG. 3 is a flow diagram illustrating a method for disseminating information in accordance with particular embodiments of the present disclosure. The specific steps will be discussed in more detail below, making reference to FIGS. 1 and 2.

According to particular embodiments, the process may begin at step 302, where a user profile 44 is generated. The user profile 44 may comprise a file of information about the user's interests, activities, and organizational roles. This information may include, but is not limited to information regarding documents that the user has viewed, saved, created, or edited. The information may also include websites or other network sites that the user has viewed. While much of this information may be found on computer system 12, information may also reside on a network. Using keyword extractors, or various other algorithms and data gathering software, these documents may help determine what subjects are of particular relevance or interest to the user.

Additionally, user profile 44 may contain information regarding the user's organizational role. For instance, this information may detail the user's role in a chain of command for security issues. Thus it may contain information about what information or projects the user has access to. This information may be predefined within user profile 44. Additionally, this information may be determined from project management or similar software. The organizational role information may also be determined from websites or other network sites that the user has viewed, as well as documents that the user has viewed, saved, created, or edited.

Additionally, user profile 44 may comprise information about governance, risk, and compliance (GRC). This may reflect ways in which the organization or enterprise may focus on and manage governance, risk, and compliance. For instance, this may include enterprise software for compliance with legal requirements, such as Sarbanes-Oxley.

In alternative embodiments, a user's profile 44 may also be generated based on similar documents or viewing histories of people other than the user. This can be particularly helpful in a workplace or enterprise environment, where a user is likely to be engaged in work as part of a team or business unit. This may also apply when users from different companies work on a collaborative project. In these instances, the two companies may share a common extranet or secured network. Generating a user profile based on activities of other team members may enlarge the scope of relevant information for the user.

When user profile 44 is generated, it may be stored in the storage device 32 of server 30, as shown in FIG. 1. Alternatively, it may be stored in computer system 12, or elsewhere on the network.

According to particular embodiments of the present disclosure, a user may be able to edit his or her own user profile 44. This may allow a user to specify what information is used in generating user profile 44. For instance, a user may also utilize a work computer for personal web surfing and email. In that situation, the user could edit his profile to exclude this personal history, so that only work-related elements would be included in the user profile 44. Additionally, the user may specify in what format user notifications will be presented. The formats of these notifications will be discussed in more detail below. The editing of a user profile may be accomplished through the creation and editing of rules or other suitable means.

At step 304, document identifiers are extracted from a user's document. In particular embodiments, this document is a document that is currently being read by the user or displayed on the user's computer screen. In the illustrated embodiments, this may comprise the email 206. This may also comprise a file the user has opened or a webpage that the user is currently viewing. In alternative embodiments, document identifiers may also be extracted from other files or documents that are not currently being used or viewed, such as documents stored on the user's computer, or websites or emails that have recently been viewed. In particular embodiments, document identifiers may be extracted from a combination of currently and recently viewed documents. In alternative embodiments, the system may not use document identifiers from any of these documents. Instead, information from user profile 44 may be employed.

The document identifiers may comprise keywords. As such, they may be extracted using any known keyword extraction techniques or software. In the illustrated embodiment, email 206 concerns a visualization workshop. In that instance, document identifiers may include the words "visualization," "workshop," and the dates the workshop is to be held.

In alternative embodiments, more advanced algorithms may be employed to extract document identifiers. These may take into account factors including, but not limited to groupings of words, organization charts, and user security access levels.

According to particular embodiments, this step may be performed at client system 10, using computer system 12. This may provide more privacy to the user by restricting extraction of the document identifiers to client side processing. This may also allow a user to select a search engine to be used and the domains to be searched. In particular embodiments, these user selections may be stored in user profile 44. According to alternative embodiments, step 304 may also be performed at server 30.

At step 306, the extracted document identifiers are used to help search an enterprise network for related documents. As used throughout this disclosure, "enterprise network" may mean any secured network used or shared by one or more businesses or enterprises. This may include, but is not limited to an intranet or extranet. In alternative embodiments, a public network, such as the Internet, may be searched, either alone or in combination with the enterprise network. In particular embodiments, user profile 44 may be used in combination with the extracted document identifiers to search for related documents. For instance, information in user profile, such as the user's job title or project involvement may be used to generate search terms. Related documents may comprise any form, including but not limited to websites, text documents, spreadsheets, slide shows, articles, emails, or calendar events. They may be deemed to be "related" based on the type of document identifiers extracted and the searching application. For instance, in the illustrated example, keywords such as "visualization" may be extracted from email 206. Therefore, in the illustrated embodiment, the related documents all deal with the concept of visualization. For example, 208A provides a frequently asked questions document regarding visualization, while 208B and 208C provide reports dealing with different aspects of visualization.

The method of searching for related documents may vary depending on the types of document identifiers used and the algorithms employed. For instance, as described above, a keyword search function may be employed using known techniques. According to particular embodiments, a database may contain a list of keywords that point to related documents. This database may be located in storage device 32. However, in alternative embodiments, it may be located on client system 10 or elsewhere on server 30. After the document identifiers are extracted, the database may be searched for matching keywords. If any matches are found, the documents they point to may be marked as "related." User profile 44 may also be used during this search. For instance, in the illustrated embodiment, the given user may be a computer programmer working on visualization software. In that situation, the user's status as a programmer may inform the searching mechanism to look for documents where the phrase "visualization" is applied specifically to software, and not just in its broader sense. Thus, information in user profile 44 may provide for disambiguation of search terms.

The database may contain pointers to documents that are located anywhere on network system 100. According to particular embodiments, this may even include documents located on the user's own computer 12. For instance, a related document may be a saved email or other file saved by a user. According to another specific embodiment, the network system may comprise an enterprise network. As such, the search for related documents may focus on documents and information focused on the enterprise. These documents may be "published" and made available for distribution across the network. However, the search may also look for "unpublished" documents that are stored on other network users' computers. Access to these unpublished documents may be governed by access control methods. For instance, user access may be defined in user profile 44, project management software, or some combination thereof. Additionally, access control measures may be enacted by the author or creator of the unpublished document.

After related documents are found, they may all be communicated to the user. However, according to particular embodiments, the documents may first be filtered. In particular embodiments, this filtering may comprise a simple prioritization or ordering of the documents. In particular embodiments, the documents may be filtered using the user profile 44 at step 308. This may include filtering the documents to satisfy the user's preferences. For instance, in editing the user profile 44, a user may specify what types of documents or subject matter he or she would like to be notified of. In a particular embodiment, the user may be primarily concerned with missing meetings or open forums. In that situation, the user may specify that he only wishes to receive emails or calendar invitations regarding upcoming related meetings.

Additionally, the filtering may depend on factors that the user is unable to edit, such as job position or security access.

This access information may be defined in user profile 44. In particular embodiments, it may also be derived from project management software, GRC software, or other access control software. For instance, certain documents, although relevant to a user's interests or job, may be deemed confidential or otherwise restricted to certain network users. This restriction may occur for many reasons, including but not limited to proprietary information or senior management considerations. In these situations, the search mechanism may return a large amount of documents, some of which the user does not have access to view. When these documents are filtered, these restricted documents will get filtered out and will not be presented to the user.

Another ground of filtering may comprise filtering for urgent or time-sensitive material. In these situations, a large number of related documents may be found by the document identifier search. Certain of these documents may be urgent or of high importance. These documents may be marked as important to further ensure the user's reception. The filtering process may also be able to determine time-sensitive material based on dates contained in the document. These documents may similarly be marked as important.

The filtering process may also take into account history, social networks, or other designations of "popularity." For instance, if a given document has been returned and presented to multiple users, and those users selected the document or otherwise expressed interest, there may be an increased likelihood that this document will be presented to a current user after filtering. Alternatively, if users have frequently ignored or otherwise expressed a lack of interest in the same document, then the filtering process may decrease the likelihood of presenting that document to the current user. This filtering may take into consideration all users who have received the same document. In particular embodiments, the filtering may only consider users with similar roles or interests who have received the same document. This may provide an increased likelihood that the documents presented to the current user will be helpful or of interest.

After the related documents are filtered, the user may be notified of their existence at step 310. The content of this notification may vary greatly depending on the particular embodiment. In particular embodiments, the notification may simply include a title of the related document. This may be seen by notifications 208A-208C. In other embodiments, the notification may include at least a portion of the content of the related document. For instance, where the document is a text document, the notification may include the first paragraph of text. In alternative embodiments, the forms of notification may further comprise a link to the relevant document. This may come in the form of hyperlinked text, or through a separate button.

In addition to the content of the notification, the method of presenting the notification may also vary greatly. According to particular embodiments, the notification may be displayed in a periphery of the user's computer screen. The periphery may be a portion of the screen that is visible to the user but does not substantially interfere with the document or information currently being viewed by the user. In the embodiment illustrated in FIG. 2, this includes a side bar attached to the window for the email application containing notifications 208A-208C.

A goal of the present disclosure may be to provide documents or information that is relevant and helpful to a user. If the application is successful in this regard, the user may want to access the documents after receiving the notification. As mentioned above, the notifications may comprise links. By clicking on them, the user may maximize the window, follow a link to the complete document, send an email (either to the user's own account or to the accounts of other network users), or add an event to a calendar.

Additionally, user notifications may also include buttons or controls. The buttons may indicate that the associated notification is helpful, and the user wishes to know more. By selecting these buttons, the user may be provided more information. In particular embodiments, this may comprise, but is not limited to, maximizing the notification window, re-directing the user to a website, opening a relevant document (i.e., text document, slideshow presentation, spreadsheet), opening an appointment in a calendar application, and/or adding an event to the user's calendar application.

Alternatively, certain buttons may indicate that the associated notification is not helpful. By selecting these buttons, the respective notification may be removed from the user's screen. Additionally, the user's selection may indicate that the user no longer wishes to receive notifications of this type.

According to particular embodiments, the user profile may be persistently generated. This means that, after the user profile is generated, it may still be updated based on the user's reaction to the related documents presented. For instance, when a user selects one of the documents, this may indicate that the document is relevant and the user finds it helpful. As such, the user profile will be updated to reflect that the document was selected by the user. This may allow the system to "learn" from the user and provide results that are more likely to be helpful to that particular user. According to particular embodiments, the documents, once opened, may also have a button asking, "Was this helpful?" Selecting the button may also cause the user profile to be updated. Selecting the button may also help the system to learn for future use by other users. In particular embodiments, the algorithms used for searching and filtering may be updated to show the popularity of a given document. This may be applied whenever a search returns the same document for other users.

For similar reasons, the present disclosure may also be configured to learn from documents that the user either ignores or does not find helpful. For instance, if the same document or similar documents are repeatedly presented to a user, and the user continually fails to ever select the item, the user profile may be updated to reflect this perceived preference. For instance, if a user never selects web pages, the user profile may be updated, decreasing the likelihood that web pages will be presented to that user in the future. In alternative embodiments, the user may actively notify the system that he is uninterested in certain documents. This may be accomplished through the use of buttons or links that say "Not interested" or some similar phrase.

It should be understood that some of the steps illustrated in FIG. 3 may be combined, modified, or deleted where appropriate, and additional steps may also be added to the flow diagram. For instance, according to particular embodiments, a user profile may not be generated or relied upon for filtering. In alternative embodiments, a user profile may be generated, and the system may search for documents related to information in that profile, and not a document currently displayed on the user's computer screen.

In addition to the advantages enumerated above, various embodiments of the present disclosure provide other benefits. For instance, the present disclosure may allow dissemination of relevant information based on a user-edited user profile. Furthermore, the teachings of the present disclosure may allow to customize the types of information received and the method of delivery. This may allow a user to automatically receive information that the user would otherwise be unaware of. Various other advantages may be readily apparent to one having skill in the art.

Although the present invention has been described in detail, it should be understood that various changes, substitutions, and alterations can be made without departing from the spirit and scope of the invention as defined by the appended claims.

What is claimed is:

1. A method, comprising:
   extracting one or more document identifiers from a document currently displayed on the user's computer screen;
   searching an enterprise network, using the one or more document identifiers, for one or more related documents that are related to the document currently displayed on the user's computer screen;
   filtering the one or more related documents; and
   notifying the user of the one or more filtered related documents by displaying at least a portion of the one or more filtered related documents in a periphery of the user's computer screen such that the portion of the one or more filtered related documents is visible to the user but does not interfere with the document currently displayed on the user's computer screen.

2. The method of claim 1, wherein notifying the user comprises sending an email to the user.

3. The method of claim 1, wherein notifying the user comprises adding, to a calendar on the user's computer, one or more events related to the one or more filtered related documents.

4. The method of claim 1, further comprising generating a user profile, and wherein filtering the one or more related documents comprises using the user profile.

5. The method of claim 4, wherein the user profile is generated based on documents stored on the user's computer.

6. The method of claim 4, further comprising: receiving, from the user, a selection of at least one of the one or more filtered related documents; and updating the user profile to reflect the user's selection of the at least one of the one or more filtered related documents.

7. The method of claim 6, further comprising updating the user profile to reflect filtered related documents that are not selected by the user.

8. The method of claim 4, further comprising allowing the user to edit the user profile.

9. The method of claim 8, wherein allowing the user to edit the user profile comprises allowing the user to select a manner in which the user is notified of the one or more filtered related documents.

10. A system, comprising:
    a processor operable to: extract one or more document identifiers from a document currently displayed on the user's computer screen;
    search an enterprise network, using the one or more document identifiers, for one or more related documents that are related to the document currently displayed on the user's computer screen;
    filter the one or more related documents; and
    notify the user of the one or more filtered related documents by displaying at least a portion of the one or more filtered related documents in a periphery of the user's computer screen such that the portion of the one or more filtered related documents is visible to the user but does not interfere with the document currently displayed on the user's computer screen.

11. The system of claim 10, wherein the processor is further operable to generate a user profile, and wherein the processor is further operable to filter the one or more related documents using the user profile.

12. The system of claim 11, further comprising an interface operable to receive, from the user, a selection of at least one of the one or more filtered related documents, and wherein the processor is further operable to update the user profile to reflect the user's selection of at least one of the one or more filtered related documents.

13. The system of claim 11, wherein the processor is further operable to update the user profile to reflect filtered related documents that are not selected by the user.

14. The system of claim 11, wherein the processor is further operable to allow the user to edit the user profile.

15. The system of claim 14, wherein the processor is further operable to allow the user to select a manner in which the user is notified of the one or more filtered related documents.

16. Logic encoded in a non-transitory, computer readable medium, and operable, when executed on a processor, to:
    extract one or more document identifiers from a document currently displayed on the user's computer screen;
    search an enterprise network, using the one or more document identifiers, for one or more related documents that are related to the document currently displayed on the user's computer screen; filter the one or more related documents; and
    notify the user of the one or more filtered related documents by displaying at least a portion of the one or more filtered related documents in a periphery of the user's computer screen such that the portion of the one or more filtered related documents is visible to the user but does not interfere with the document currently displayed on the user's computer screen.

17. The logic of claim 16, wherein the logic is further operable to generate a user profile, and wherein the logic is further operable to filter the one or more related documents using the user profile.

18. The logic of claim 17, wherein the logic is further operable to: receive, from the user, a selection of at least one of the one or more filtered related documents; and update the user profile to reflect the user's selection of at least one of the one or more filtered related documents.

19. The logic of claim 18, wherein the logic is further operable to update the user profile to reflect filtered related documents that are not selected by the user.

20. The logic of claim 16, wherein the logic is further operable to allow the user to edit the user profile.

21. The logic of claim 20, wherein the logic is further operable to allow the user to select a manner in which the user is notified of the one or more filtered related documents.

22. A method, comprising:
    extracting one or more document identifiers from a document currently displayed on the user's computer screen;
    searching an enterprise network, using the one or more document identifiers, for one or more related documents that are related to the document currently displayed on the user's computer screen;
    filtering the one or more related documents; and
    notifying the user of the one or more filtered related documents: and further wherein the document currently displayed comprises an email, and wherein extracting the one or more document identifiers comprises extracting the one or more document identifiers from the email currently displayed on the user's computer screen.

23. The method of claim 22, further comprising: in response to searching the enterprise network for one or more related documents, identifying a related email that is related to the email currently displayed on the user's computer screen.

24. The method of claim 23, further comprising: displaying at least a portion of the related email that is identified as being related to the email currently displayed on the user's computer screen in a periphery of the user's computer screen such that the portion of the related email is visible to the user but does not interfere with the email currently displayed on the user's computer screen.

* * * * *